US010793031B1

(12) United States Patent
Daniels et al.

(10) Patent No.: US 10,793,031 B1
(45) Date of Patent: Oct. 6, 2020

(54) VEHICLE SEAT WITH STORABLE HARNESS

(71) Applicant: Hickory Springs Manufacturing Company, Hickory, NC (US)

(72) Inventors: Danny J. Daniels, Hickory, NC (US); James Louis Rapier, III, Purlear, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 114 days.

(21) Appl. No.: 15/934,261

(22) Filed: Mar. 23, 2018

Related U.S. Application Data

(60) Provisional application No. 62/475,389, filed on Mar. 23, 2017.

(51) Int. Cl.
*B60N 2/26* (2006.01)
*B60R 22/10* (2006.01)
*B60R 22/02* (2006.01)
*B60N 2/24* (2006.01)

(52) U.S. Cl.
CPC ............ *B60N 2/265* (2013.01); *B60R 22/105* (2013.01); *B60N 2/242* (2013.01); *B60R 2022/029* (2013.01)

(58) Field of Classification Search
CPC ...... B60N 2/265; B60N 2/3086; B60N 2/242; B60R 22/105; B60R 2022/209
See application file for complete search history.

(56) References Cited

U.S. PATENT DOCUMENTS

| 2,112,150 A | | 3/1938 | Farris | |
|---|---|---|---|---|
| 3,295,887 A | | 1/1967 | Bacon | |
| 3,902,642 A | | 9/1975 | McNeece | |
| 4,205,670 A | | 6/1980 | Owens | |
| 4,533,176 A | * | 8/1985 | Wyttenbach | B60N 2/3084 297/14 |
| 5,015,033 A | | 5/1991 | Winters | |
| 5,121,964 A | * | 6/1992 | Fourrey | B60N 2/283 297/236 |
| 5,260,684 A | * | 11/1993 | Metzmaker | B60N 2/002 340/425.5 |
| 5,282,666 A | * | 2/1994 | Derrick | B60N 2/3081 297/237 |

(Continued)

FOREIGN PATENT DOCUMENTS

| CA | 2688683 A1 | 6/2011 |
|---|---|---|
| CN | 206394481 U | 8/2017 |

(Continued)

OTHER PUBLICATIONS

Non-Final Office Action dated Feb. 26, 2019 in U.S. Appl. No. 15/248,402 for Daniels et al., filed Aug. 26, 2016, 14 pages.

(Continued)

*Primary Examiner* — David R Dunn
*Assistant Examiner* — Tania Abraham
(74) *Attorney, Agent, or Firm* — Perkins Coie LLP (57) ABSTRACT

A stowable harness system for a vehicle seat is provided. The vehicle seat has a storage area under a horizontal seat portion that pivots to provide access. The harness system includes a belt system for a child restraint. During use, the harness system is disposed on the vehicles seat. When stowed, the harness system is contained in the storage area.

12 Claims, 10 Drawing Sheets

(56) References Cited

U.S. PATENT DOCUMENTS

| | | | |
|---|---|---|---|
| 5,542,742 A * | 8/1996 | Fulgenzi | B60N 2/3086 |
| | | | 297/236 |
| 5,553,918 A * | 9/1996 | Baret | B60N 2/3081 |
| | | | 297/237 |
| 5,829,828 A | 11/1998 | Asfaw | |
| 6,109,686 A * | 8/2000 | Fox | A47D 11/02 |
| | | | 297/105 |
| 6,375,270 B1 | 4/2002 | Sullivan et al. | |
| 7,029,067 B2 | 4/2006 | Vits et al. | |
| 7,070,239 B1 * | 7/2006 | Ugrekhelidze | B60N 2/3084 |
| | | | 297/105 |
| 7,347,494 B2 | 3/2008 | Boyle et al. | |
| 7,517,016 B1 * | 4/2009 | West | B60N 2/832 |
| | | | 297/236 |
| 7,770,696 B2 | 8/2010 | Futahashi et al. | |
| 7,954,895 B2 | 6/2011 | Freeman et al. | |
| 8,016,318 B2 | 9/2011 | Nezaki | |
| 8,113,584 B2 | 2/2012 | Boyle et al. | |
| 8,210,617 B2 * | 7/2012 | Aaron | B60N 2/2833 |
| | | | 297/253 |
| 9,108,543 B1 | 8/2015 | Knapp | |
| 9,643,520 B2 * | 5/2017 | Lee | B60N 2/60 |
| 9,656,583 B2 | 5/2017 | Gaither et al. | |
| 10,391,896 B1 | 8/2019 | Daniels et al. | |
| 2007/0013212 A1 * | 1/2007 | Meister | B60N 2/76 |
| | | | 297/115 |
| 2009/0242700 A1 | 10/2009 | Raymond | |
| 2013/0020847 A1 | 1/2013 | Smith et al. | |
| 2013/0187421 A1 * | 7/2013 | Foye | B60R 22/024 |
| | | | 297/232 |
| 2018/0079329 A1 * | 3/2018 | Theander | B60N 2/986 |

FOREIGN PATENT DOCUMENTS

| | | |
|---|---|---|
| EP | 2556991 A1 | 2/2013 |
| GB | 438465 A | 11/1935 |
| GB | 2447708 A | 9/2008 |

OTHER PUBLICATIONS

Notice of Allowance dated Apr. 2, 2019 in U.S. Appl. No. 15/248,402 for Daniels et al., filed Aug. 26, 2016, 7 pages.

Non-Final Office Action dated Nov. 29, 2019 in U.S. Appl. No. 16/455,488 for Daniels et al., filed Jun. 27, 2019, 12 pages.

Notice of Allowance dated Feb. 14, 2020 in U.S. Appl. No. 16/455,488 for Daniels, dated Jun. 27, 2019.

* cited by examiner

VEHICLE SEAT WITH STORABLE HARNESS

CROSS-REFERENCE TO RELATED PATENT APPLICATIONS

The present application claims priority to U.S. Patent Application Ser. No. 62/475,389, filed Mar. 23, 2017, which is incorporated herein by reference as if set out in full.

BACKGROUND

Child seats for safely securing a child occupant inside a vehicle are known in the art (see, e.g., U.S. Pat. No. 7,054,895 assigned to Britax Excelsior Limited (GB), the entire disclosure of which is herein incorporated by reference). Typically, child seats are situated on and secured to seats that are installed in the vehicle. The installed seats and/or their restraints (e.g., belts) are generally not sized appropriately lot the child occupant, thereby necessitating use of, the child seats. Given their construction. Child seats are often rigid, heavy, bulky items that are not readily portable over a considerable distance. Thus, there is a need for an improved child seat for safely securing a child occupant inside a vehicle.

Some mass transit vehicles, such as school buses, airplanes, trains, and the like, employ bench style seats with belts. Similar to other vehicle seats, the bench seats have belts that are typically not sized for younger children, such as, for example, toddlers and infants. The seats on these vehicles, however, are not readily adaptable for use with the above mentioned child seats, such as the '895 Patent identified above. To overcome the issues, companies have developed types of portable child restraint seats. One particularly well designed portable child restraint seat is described in U.S. Pat. No. 9,108,543 assigned to The C.E. White Co., which is a wholly owned subsidiary of Hickory Springs Manufacturing Co., the disclosure of which is incorporated herein by reference as if set out in full. Other portable, or detachable, restraint systems include, among others, those disclosed in U.S. Pat. Nos. 8,113,584; 7,770,696; and 7,347,494 assigned to Indiana Mills & Manufacturing, Inc., the discloses of which are incorporated herein as if set out in full.

The restraint systems described above, while functional for their intended purpose, have one or more drawback. The restraint systems mentioned above typically couple to the vehicle seat using a plate and belt system. The coupling system has at least one component that wraps over or about the vehicle seat to a rearward side of the vehicle seat to secure the restraint system adequately for the passenger. Because the coupling system encroaches the rearward side of the vehicle seat, certain safety regulations prevent passengers for common carriers, such as school buses, to sit in the seats directly behind the portable restraint system, which limits the total number of passengers the vehicle can contain. Another drawback for the restraint systems are that they tend to be cumbersome and unsightly.

Thus, against the background, improved vehicle seats with stored harnesses is desirable.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a vehicle seat with an integral harness is provided. The integral harness is rotationally coupled to a harness plate. The harness plate is rotationally coupled to a base plate, which base plate is coupled to the vehicle frame to allow the integral harness to rotate from a storage position to a deployed position. The belt system associated with the harness includes a pair of shoulder straps that extend along a generally vertical back of the vehicle seat. Latches couple the pair of shoulder straps to latch bars on the vehicle seat frame.

In some aspects, the vehicle seat is a bench style seat. The vehicle seat may reside in a vehicle such as a school bus, commercial bus, car, truck, train, boat, airplane, recreational vehicle, or the like.

These and other aspects of the present system and method will be apparent after consideration of the Detailed Description and figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a bench seat typical of a school bus seat. However, the technology described herein may be used for other vehicle seats including, in particular, vehicle bench seats such as, for example, those found on trains, boats, ships, airplanes, and the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
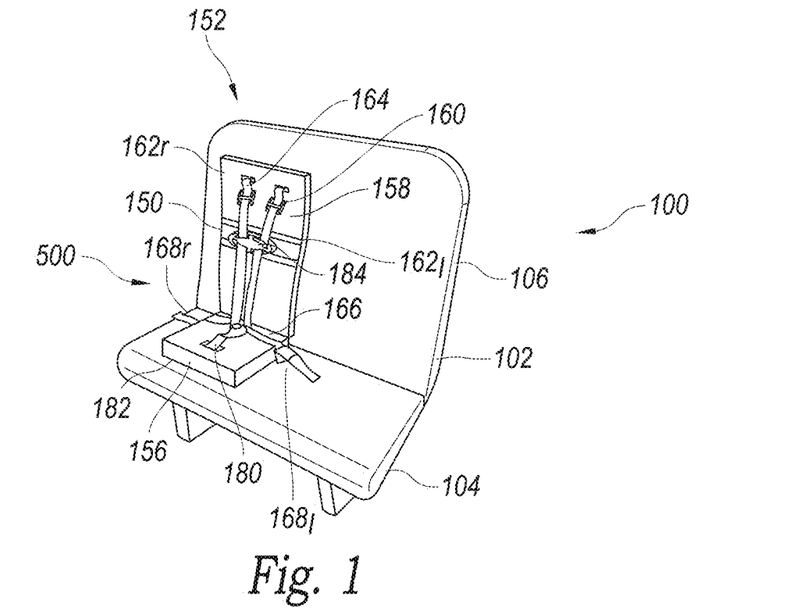
FIG. 1 is a front perspective view of a bench seat with a harness in a use position consistent with the technology of the present application.
Figure 2:
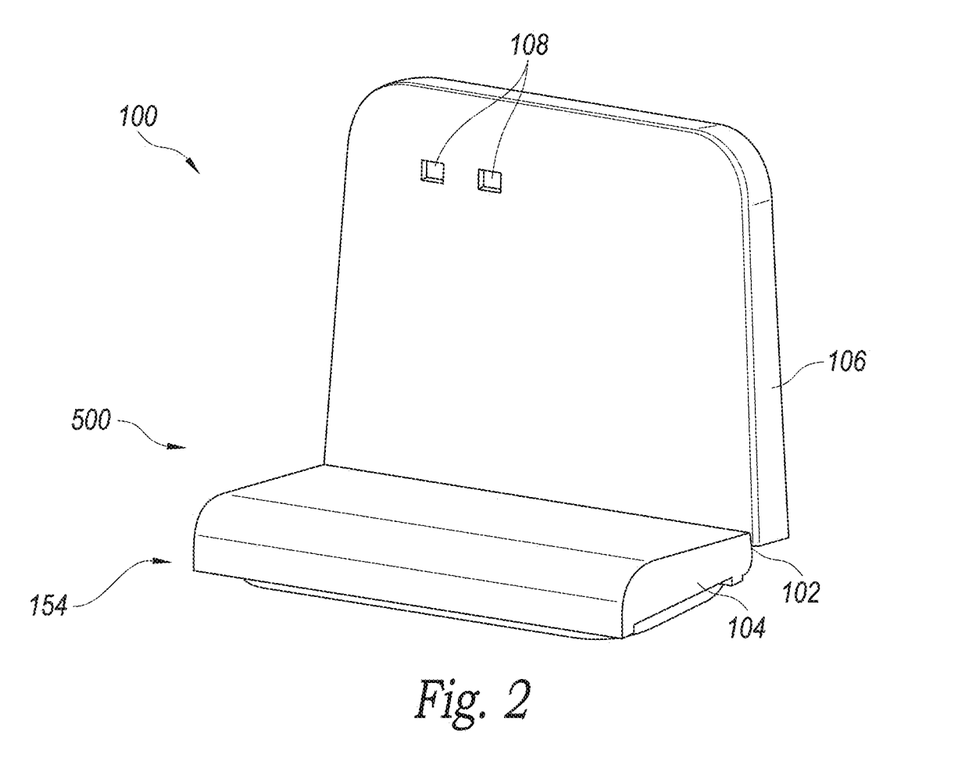
FIG. 2 is a front perspective view of the bench seat of FIG. 1 with the harness in a stored position consistent with the technology of the present application.

With reference now to FIGS. 1 and 2, front, perspective views of a vehicle seat 100 consistent with the technology of the present application are provided. FIG. 1 shows the vehicle seat 100 with a harness 150 configured for use thereon. FIG. 2 shows the vehicle seat 100 with the harness 150 stored. The harness 150 is movable from the use position 152 (FIG. 1) to a stowed position 154 (FIG. 2 although the storage is not readily seen in FIGS. 1 or 2), the details of which are descried below. The harness 150 has a first cushion 156 and a second cushion 158. The first cushion 156 is generally horizontal and, in the use position 152, extends from a bite 102 of the vehicle seat 100 generally horizontally forward. The bite 102 of the vehicle seat is the location of where the generally horizontal seat portion 104 of the vehicle seat 100 meets the generally vertical back portion 106 of the vehicle seat 100. The first cushion 156, if used, would rest on the horizontal seat portion 104 when in use. The vehicle seat 100 may have a conventional belt system with lap and/or shoulder belts (not specifically shown) extending in part from the bite 102. The second cushion 158 comprises a generally vertical cushion extending from the bite 102 generally vertically along the vertical back portion 106 of the vehicle seat 100. The first cushion 156 and the second cushion 158 may be in multiple pieces. Moreover, the first cushion 156 and the second cushion 158 are generally optional as the generally horizontal seat portion 104 and the generally vertical seat portion 106 are already cushioned.

The harness 150 has a belt system 160. The harness 150 and belt system 160 are configured to be integral with the vehicle seat 100 once installed. The belt system 160 includes first and second shoulder straps $162_{r,l}$ that each generally extend from an upper latch assembly 164 to a lower latch 166 and from the lower latch 166 to first and second anchor points $168_{r,l}$ on the first cushion 156 or an anchor elsewhere on the vehicle seat (to be described below). A lap belt 180 is anchored at a third anchor point 182 and latches to the lower latch 166. The third anchor point 182 may be coupled to the first cushion 156 or an anchor elsewhere on the vehicle seat (to be described below). A chest clasp 184, such as a snap buckle having first and second selectively engageable components, may couple the first and second shoulder straps $162_{r,l}$ about a chest of the rider. The above described belt system 160 generally describes a 5-point harness 150. Other belt systems may be compatible with the present technology including shoulder belts, lap belts, 3 point harnesses, and the like.

Figure 3:
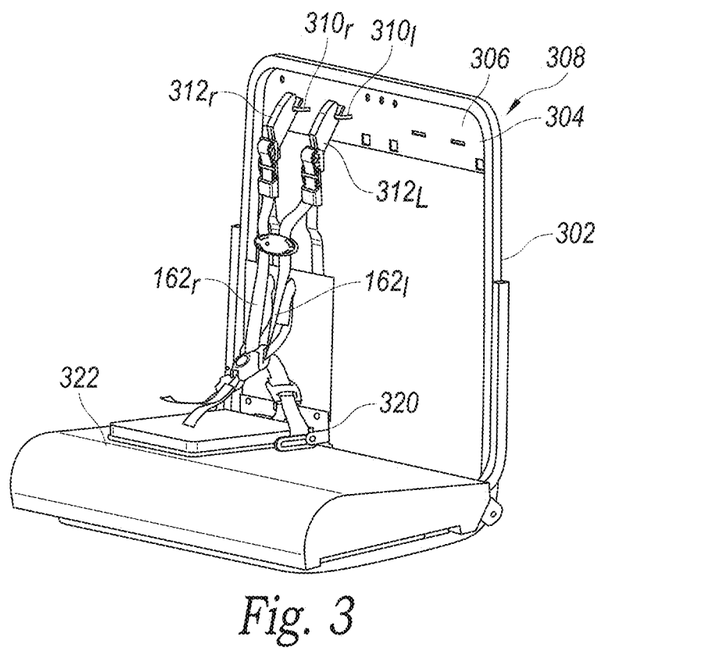
FIG. 3 is a front perspective view of the bench seat of FIG. 1 with the harness in the use position with certain portions of the bench seat removed for clarity.
Figure 4:
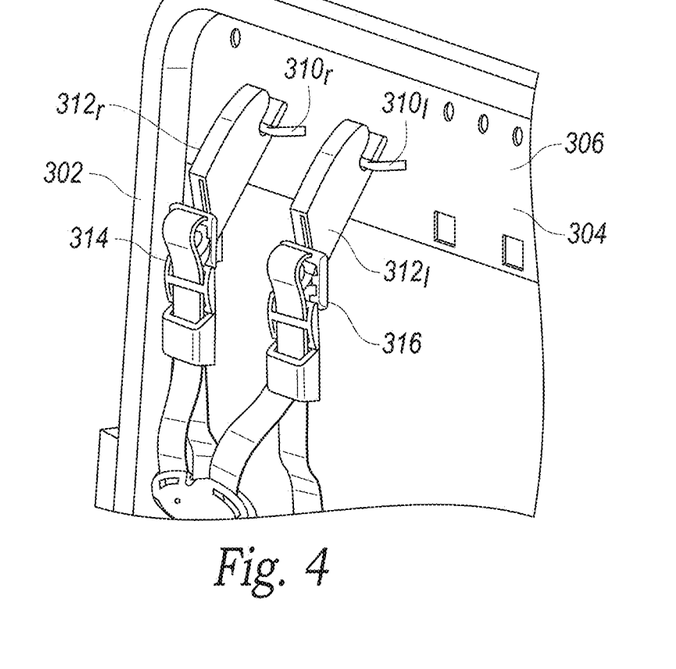
FIG. 4 is a front perspective view of the latches of FIG. 3.

Views of the upper portion 300 of the vehicle seat 100 are shown in FIGS. 3 and 4. The views remove portions of the second cushion 158 and the vertical back portion 106 of the vehicle seat 100 for clarity. The vehicle seat 100 has a back frame 302, which is shown as a generally tubular inverted U-shaped member, but other frame constructions are within the spirit and scope of the present technology. A back frame plate 304 is coupled to the back frame 302. The back frame plate 304 has a forward facing surface 306 and a rearward facing surface 308 opposed to the forward facing surface 306. As shown, a pair of latch bars $310_{r,l}$ extend forwardly from the forward facing surface 306 of the back frame plate 304. Latches $312_{r,l}$ are releasably coupled to the latch bars $310_{r,l}$. The latches $312_{r,l}$ extend forwardly to the back side of second cushion 158 (if used). The first and second shoulder straps $162_{r,l}$ each have an upper portion 314 (FIG. 4) that is looped through a plate 316. The plate 316 is generally flush with the front side of second cushion 158 (if used). If the second cushion is not used, the latches $312_{r,l}$ may extend to the plate 316, which plate 316 is flush against the vertical back portion 106 of vehicle seat 100. The first and second shoulder straps $162_{r,l}$ in this embodiment loop around the plate 316 and anchor at anchor points 318 on a base plate 320, which will be described further below.

As can be seen in FIG. 3, the first cushion 156 may be mounted on a rigid plate 322, such as a metal plate. Similarly, second cushion 158 may be mounted on one or more rigid plate (not specifically shown). Typically the second cushion 158, if used, will be required to fold such that multiple plates are used for the support or second cushion 158 where such plates are retained using hinges or folds.

With reference back to FIG. 2, the vertical back portion 106 has channels 108 formed in the cushion. The channels 108 allow the latches $312_{r,l}$ to extend back to the latch bars $310_{r,l}$. Also, while shown as two distinct latch bars $310_{r,l}$, the latch bars may in fact be a single latch bar. In certain embodiments, the back frame plate 304 may be replaced with one or more cross members. The cross members may, in certain instances, be used in place of one or more latch bars. The latch bar, bars, or cross member may be any rigid member such as tubular metals, composites, or the like.

Figure 5:
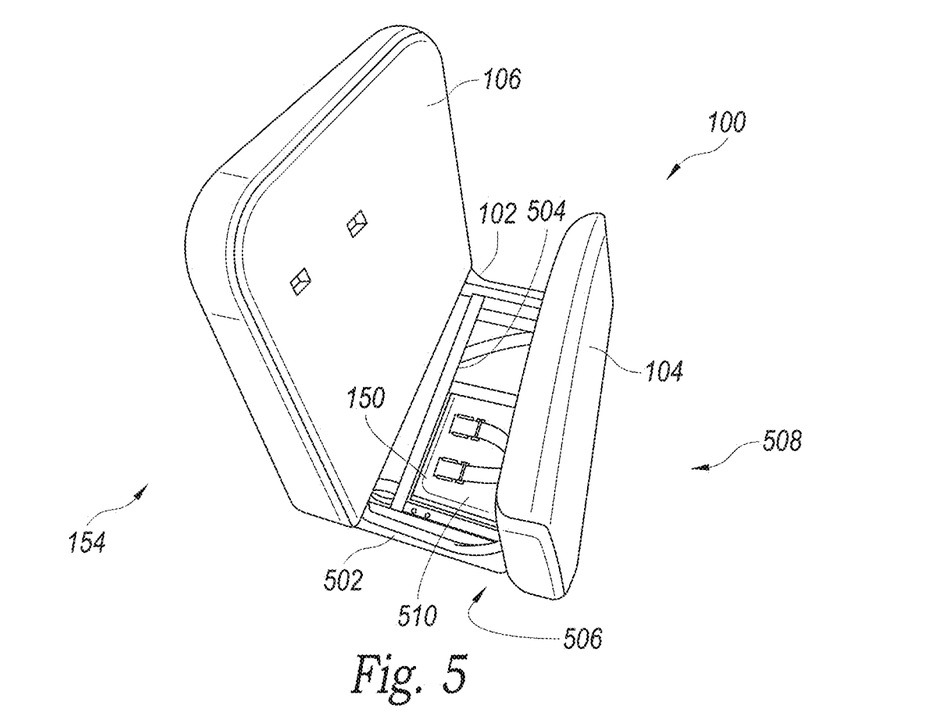
FIG. 5 is a front perspective view of the bench seat of FIG. 1 with the horizontal seat portion in the storage access position and the harness in a stored position consistent with the technology of the present application.

FIG. 5 shows the vehicle seat 100 consistent with the technology of the present application. As can be appreciated, FIG. 2 shows vehicle seat 100 with the harness 150 in the stowed position 154 but the vehicle seat 100 configured to allow individuals to sit in the vehicle seat. As such, the vehicle seat 100 has the generally vertical back portion 106 and the generally horizontal seat portion 104, which converge at the bite 102. FIG. 5 show, among other things, that the horizontal seat portion 104 is formed in part by a horizontal U-shaped frame 502, which could be a rectangular frame or other configurations as required. The horizontal U-shaped frame 502 has one or more cross members 504 to provide support and integrity for the vehicle seat 100. The generally horizontal seat portion 104 is coupled to the horizontal U-shaped frame 502 (or one of the cross members 504 or the like) with a hinge 506, such as, for example, a conventional door hinge or a piano hinge, although any coupling means for rotating the horizontal seat portion 104 is possible. The hinge (or hinges) 506 allows the generally horizontal seat portion 104 to be rotated from a use or ride position 500 (FIGS. 1 and 2) to a storage access position 508 (FIG. 5). In the storage access position 508, the storage compartment 510 is accessible. The storage compartment 510 may include one or more bins 512. In this exemplary embodiment, the storage compartment 510 holds the harness 150, which in certain embodiments may be only a belt system 160. The storage compartment 510 may hold other peripheral devices in other aspects.

Figure 6:
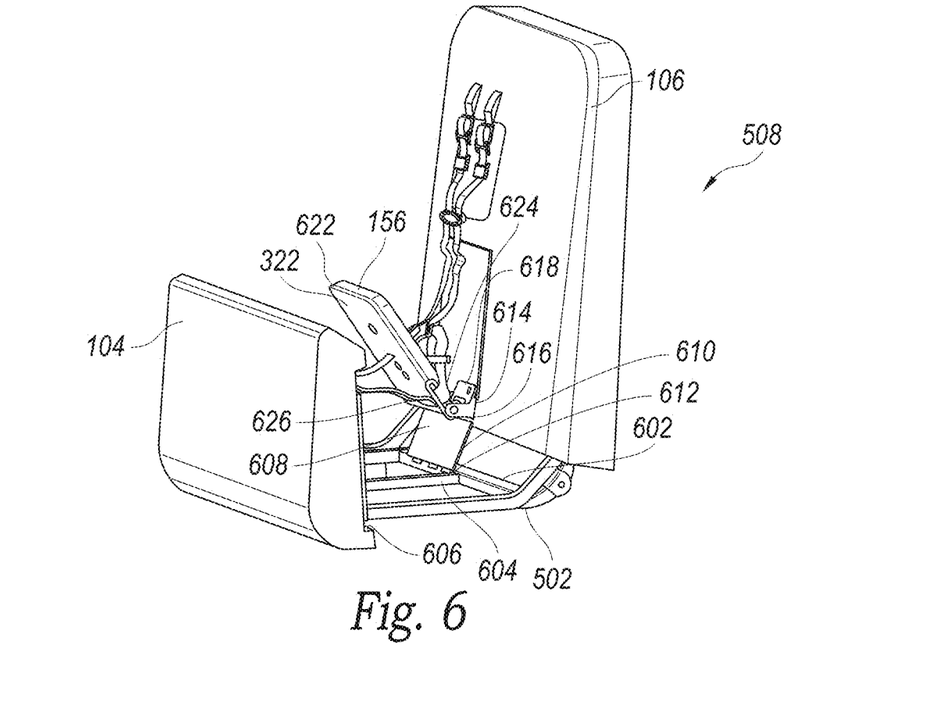
FIG. 6 is a front perspective view of the bench seat of FIG. 1 with the horizontal seat portion in the storage access position and the harness moved from the stored position towards the use position consistent with the technology of the present application.
Figure 7:
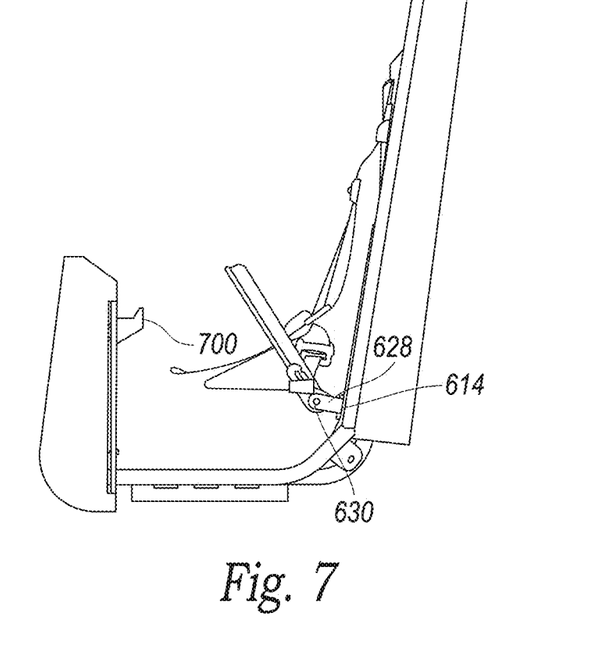
FIG. 7 is an elevation view of FIG. 6.

FIGS. 6 and 7 show the vehicle seat 100 with the horizontal seat portion 104 rotated to the storage access position 508 with certain portions not shown for convenience. The horizontal U-shaped frame 502 includes a bite cross member 602, which together with the U-shaped frame 502 generally forms a rectangular base frame. One or more support members 604 may extend from the bite cross member 602 to the front bar 606 of the U-shaped frame 502. A base plate 608 is rotationally coupled to the bite cross member 602 at a rear end 610 of the base plate 608. A hinge 612 may be the means for rotationally coupling the base plate 608 to the bite cross member 602. A harness plate 614 is rotationally coupled to the base plate 608 at a forward end 616 of the base plate 608. The forward end 616 is opposite the rear end 610. A hinge 618 may be the means for rotationally coupling the harness plate 614 to the base plate 608. The first cushion 156 of the harness 150 is rotationally coupled to the harness plate 614. The first cushion 156, in this exemplary embodiment, comprises a rigid bottom plate 620, which has a free forward end 622 and a bulbous second end 624 opposite the free forward end 622. The bulbous second end 624 includes a bore 626. The harness plate 614 has a pair of opposed tangs 628 (FIG. 7) extending from the harness plate 614. An axle 630, coupled to the opposed tangs 628 extends through the bore 626 to allow the rigid bottom plate 620 to rotate with respect to the harness plate 614. Other means for coupling, such as a door or piano hinge, would be useable as well.

As shown best in FIG. 7, the horizontal seat portion 104 has one or more latch member 100 extending beneath the horizontal seat portion 104. When rotated to the use or ride position, the latch member 700 engages the bite cross member 602 (or another member coupled to the frame) to hold the horizontal seat portion 104 in the use or ride position.

Figure 8:
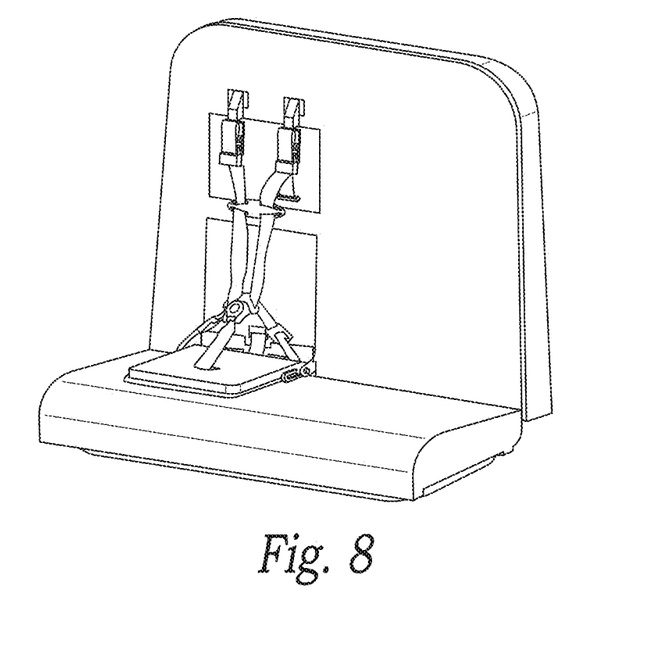
FIG. 8 is a front perspective view of a bench seat with a harness in a use position consistent with the technology of the present application.

To deploy the harness 150 (or the belt system 160 if a complete harness is not used), the horizontal seat portion 104 is unlatched (if latched) and rotated to the stowage access position (see FIGS. 5-7). The base plate 608 is rotated about the bite cross member 602 from the storage compartment 510 upwards until such a position as the horizontal seat portion 104 can be rotated back to the use or ride position, which position is generally when the base plate 608 is at about a 90-degree angle with the horizontal U-shaped frame 502. When in this position, the horizontal seat portion 104 is rotated down to the use or ride position, which substantially simultaneously causes the base plate 608 to continue its rotation until the harness plate 614 engages or rests against the vertical seat portion 106. Notice, the harness plate 614 and base plate 608 may each be rotated together or separately. Once the harness plate 614 is in place, the rigid bottom plate 620 may be rotated down to rest on the horizontal seat portion 104. The second cushion (or cushions) 158 are unfolded and the latches $312_{r,l}$ are coupled to the latch bars $310_{r,l}$ as described above. Notice, the latches $312_{r,l}$ may be coupled to the latch bars $310_{r,l}$ in advance of rotating the horizontal seat portion 104 to the use or ride position, which ride position is shown in FIG. 8.

To store the harness 150 (or the belt system 160 if a complete harness is not used), the above may be performed in reverse. For example, the latches $312_{r,l}$ may be uncoupled from the latch bars $310_{r,l}$ and folded. The rigid bottom plate 620 may be rotated to a vertical position. The harness plate 614 and base plate 608 may be partially rotated off the vertical seat portion 106. The horizontal seat portion 104 is unlatched and rotated to a vertical storage access position. The base plate 608 and harness plate 614 along with the harness 150 are rotated into the storage compartment 510. Finally, the horizontal seat portion 104 is rotated back to the use or ride position.

In certain embodiments, one or both of the first cushion 156 and second cushion 158 may not be used. In those embodiments, the first and second shoulder straps $162_{r,l}$ would have anchor points on the harness plate 614. The lap belt 180 would anchor to an alternative anchor point as well, such as, for example, the horizontal U-shaped frame 502 and would wrap around the front of the horizontal seat portion 104.

Figure 9:
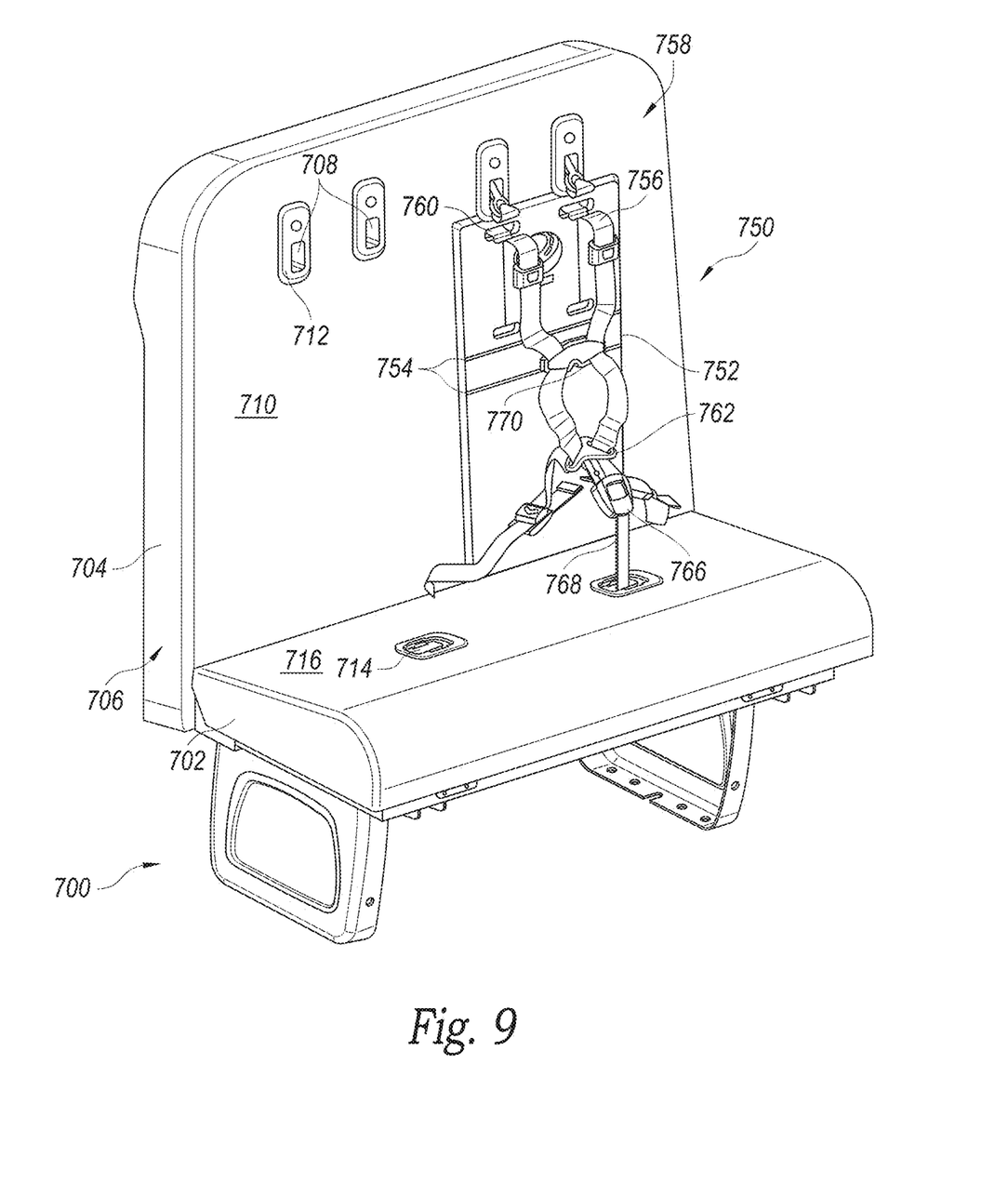
FIG. 9 is a front perspective view of a bench seat with the stowable harness in a use position consistent with the technology of the present application.
Figure 11:
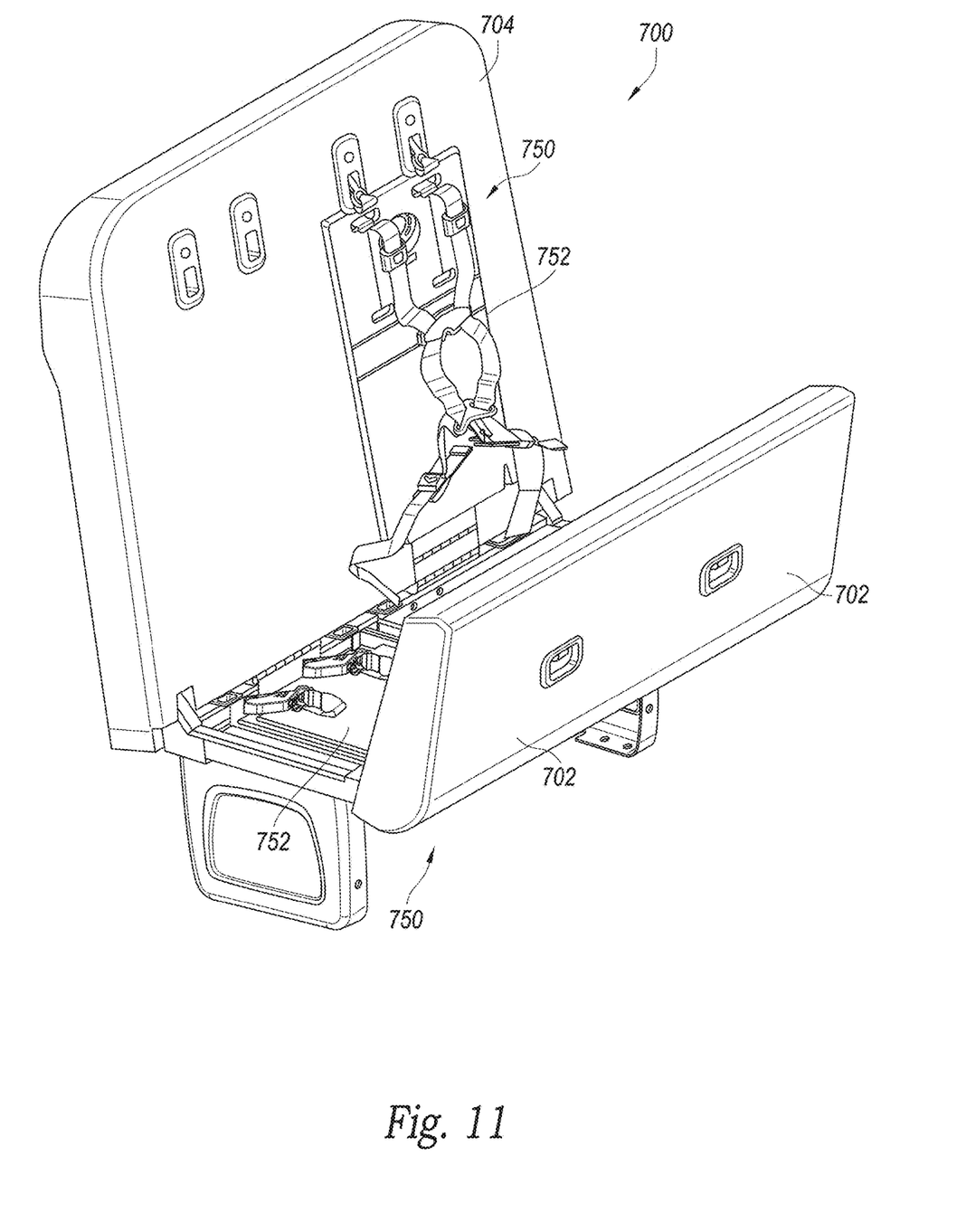
FIG. 11 is another front perspective view of the bench seat of FIG. 9 with the horizontal seat portion rotated to the open position.
Figure 12:
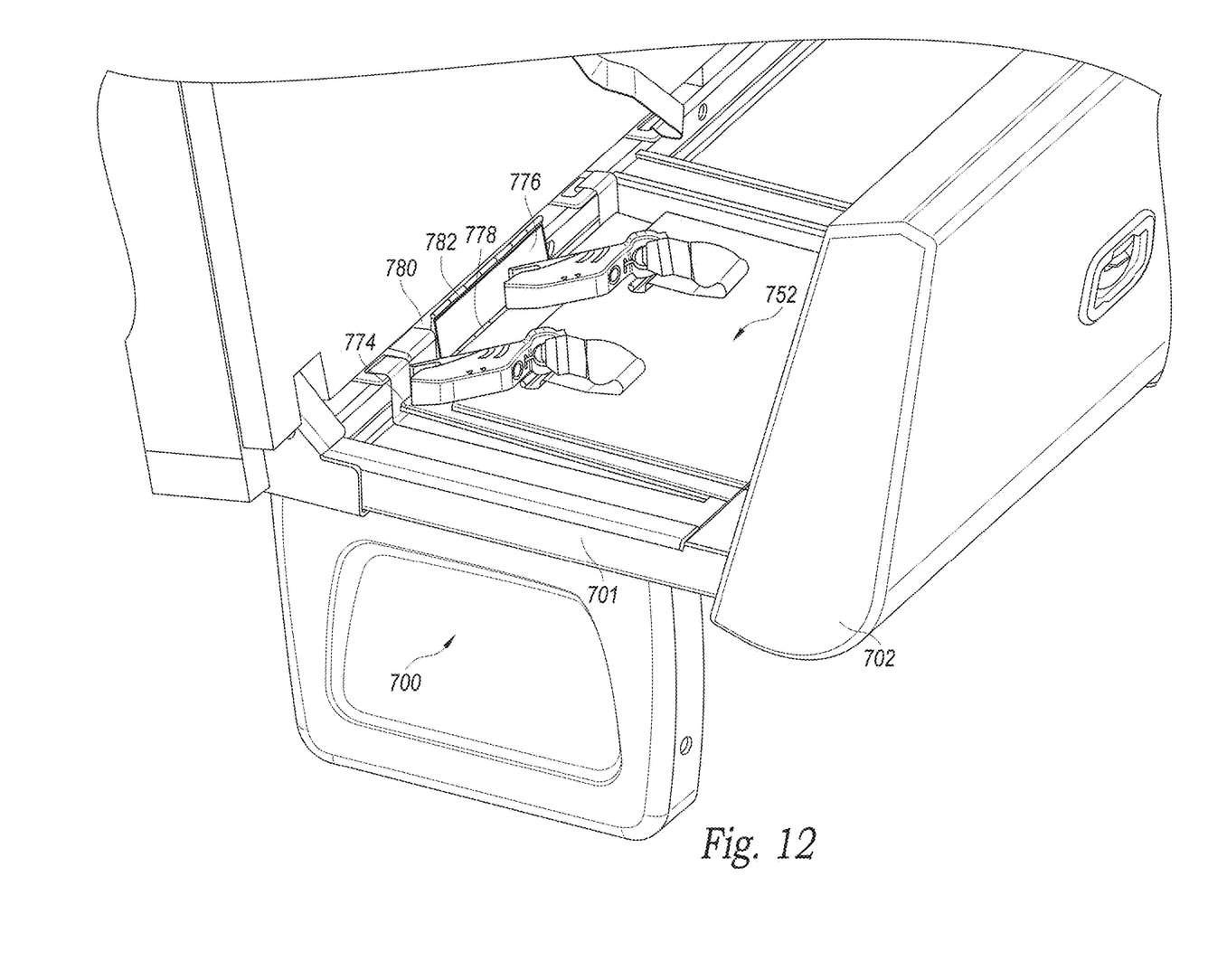
FIG. 12 is a detail of the bench seat with the stowable harness in a storage area of the vehicle seat consistent with the technology of the present application.
Figure 13:
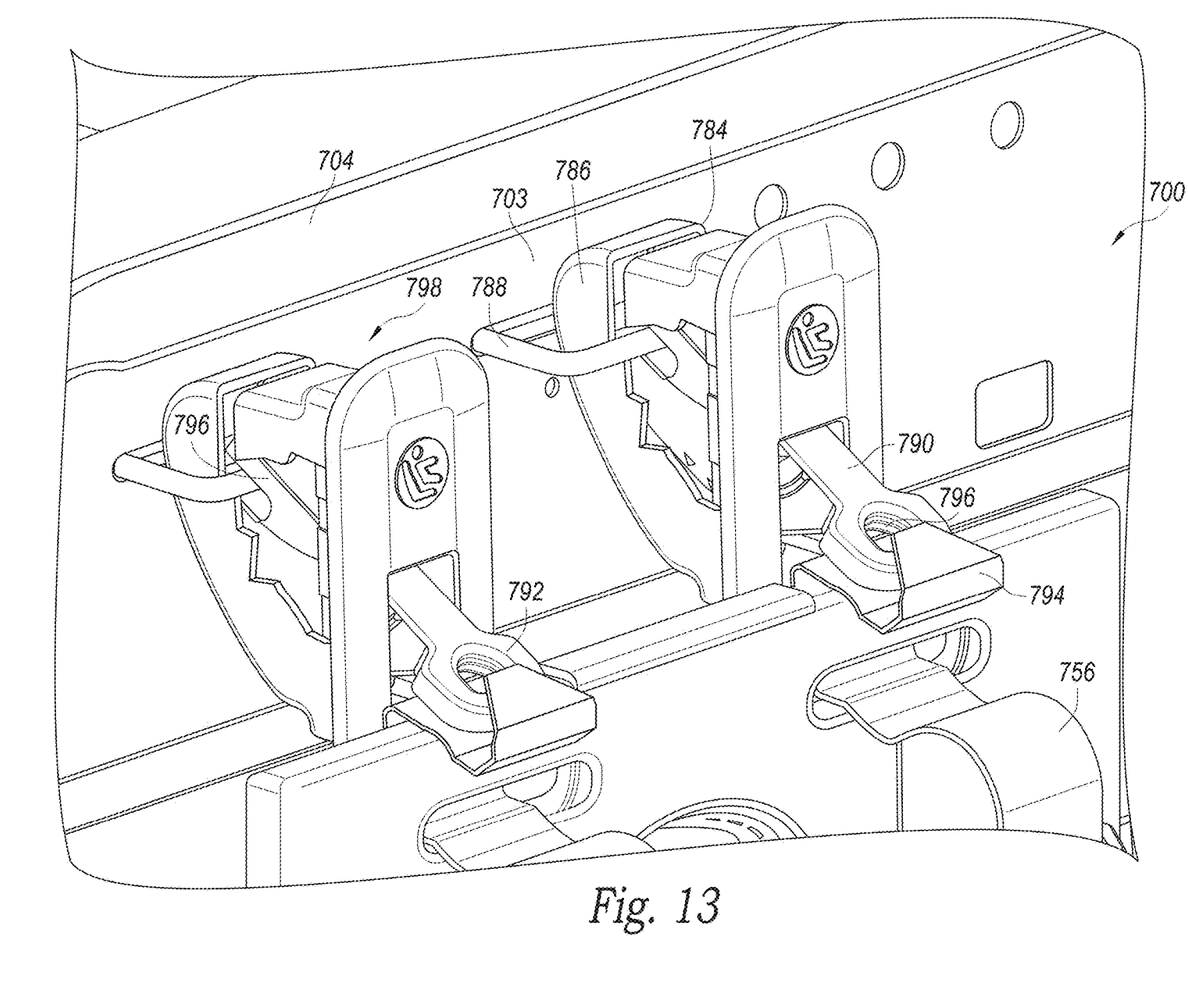
FIG. 13 is a detail of the upper latches of the harness of FIG. 9 consistent with a version of the technology of the present application.

FIG. 9 shows a vehicle bench seat 700 consistent with the technology of the present application. The vehicle bench seat 700 has an integrated harness 750. The vehicle bench seat 700 includes a horizontal seat portion 702 and a vertical seat portion 704. The vehicle bench seat 700 includes a seat bite 706 at the junction of the horizontal seat portion 702 and the vertical seat portion 704. The integrated harness 750 has a vertical pad/plate back 752. The vertical pad/plate 752 may include pads (or cushions), rigid plates, or a combination of both. The vertical pad/plate back 752 is formed of three panels as shown to form fold hinges 754 to allow the vertical pad/plate back 752 to fold for storage as shown in FIGS. 11 and 12 below. The vertical seat portion 704 has a plurality of channels 708. The channels 708 extend from a front face 710 of the vertical seat portion 704 to at least a latch bar (as seen in FIG. 13 below). The channels 708 may have a face plate 712. Similarly, the horizontal seat portion 702 may have a plurality of wells 714 that extend from a top face 716 of the vertical seat portion 702 to an anchor point (not specifically shown), which anchor portion may be the base of the well 714 or the frame of the vehicle bench seat 700.

Figure 10:
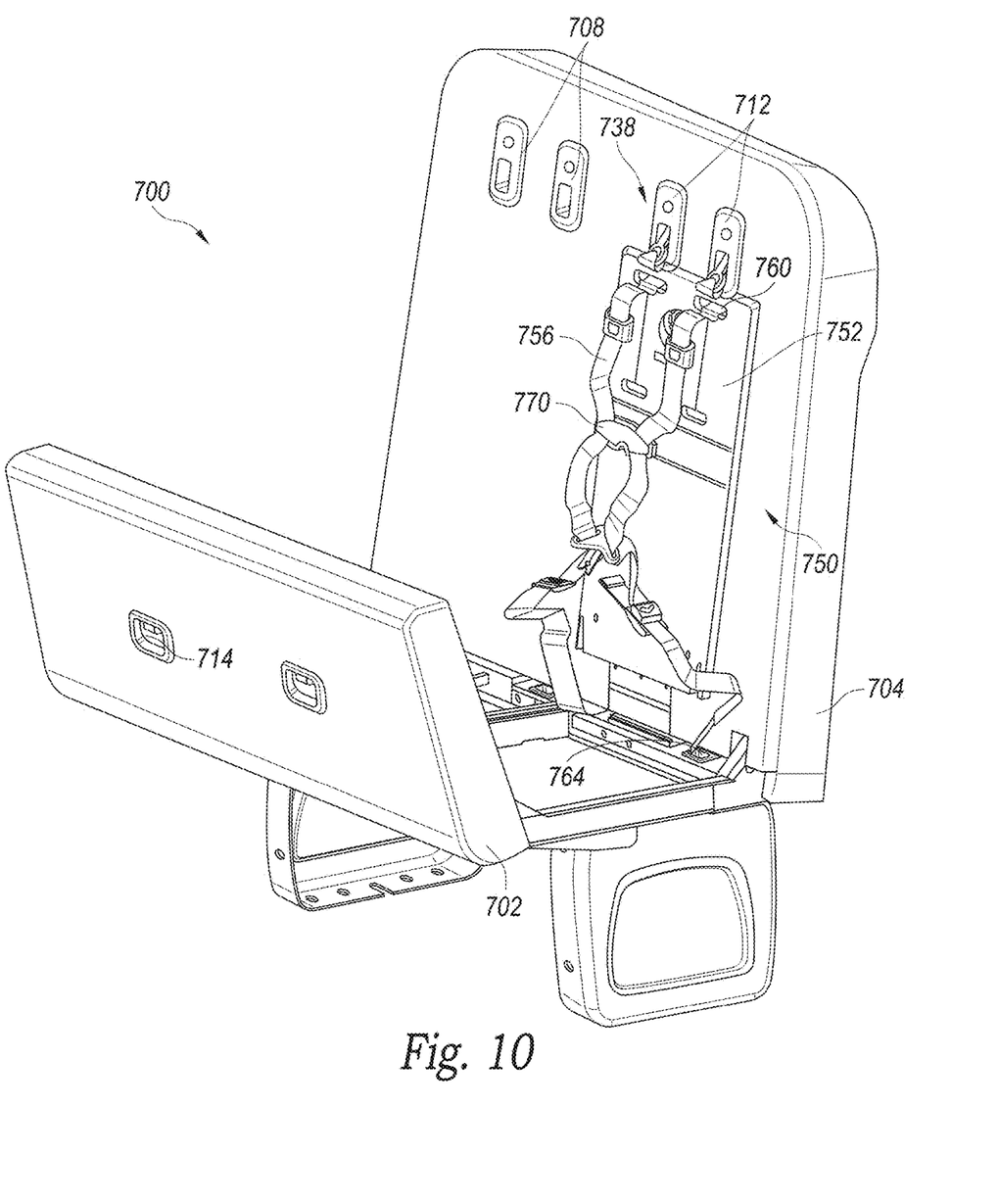
FIG. 10 is a front perspective view of the bench seat of FIG. 9 with the horizontal seat portion rotated to the open position.

The harness 750 comprises a plurality of shoulder straps 756, which include a left and a right shoulder strap. The shoulder straps 756 include an upper anchor 758 that attaches, in this embodiment, to the upper latches, which will be explained below with reference to FIG. 12. The shoulder straps 756 could loop over a top edge of the vertical pad/plate back 752 or be threaded through bores 760 as shown. The shoulder straps 756 extend to a male buckle 762 and loop through the male buckle 762 to terminate at an anchor point on the vehicle bench seat frame 764 (FIG. 10), which is typically accessible through the seat bite 706. The male buckle 762 is releasably coupled to a female buckle 766. A lap belt 768 is coupled to the female buckle 766 at one end and extends through the well 714 to the anchor point at the other end. The shoulder straps 756 may be coupled to first and second snap portions of a chest buckle 770.

FIG. 11 should the vehicle bench seat 700 with the horizontal seat portion 702 rotated to the open position. The vehicle bench seat 700 has two (2) integrated harnesses 750. A first harness 750 has the vertical pad/plate back 752 folded into the storage area under the horizontal seat portion 702 and the second harness 750 has the vertical pad/plate back 752 unfolded and extending along the vertical back portion 704 of the vehicle bench seat 700. The harness 750 has a plurality of upper latches 772. When folded, the latches 772 reside generally on top of the folded vertical pad/plate back 752. To unfold the vertical pad/plate back 752, the upper latches 772 may be grasped and lifted to latch to the latch bars, which results in unfolding the vertical pad/plate back 752.

FIG. 12 shows a portion of the vehicle seat 700 in more detail. The horizontal seat portion 702 is rotated to the open position (or flipped up) on the vehicle seat frame 701. The vertical pad/plate back 752 is shown folded and stowed in the storage area. A base 774 of the vertical pad/plate back 752 is coupled to a harness plate 776. The vertical pad/plate back 752 is rotationally coupled to the harness plate 776 using a hinge 778, such as, for example, a piano hinge or the like. In other embodiments, a web of material may be used to form the hinge. The harness plate 776, on the opposite side, is rotationally coupled to a base plate 780 at another hinge 782 (or a second hinge). The hinge 782 may be a conventional piano hinge or the like. The base plate 780 is coupled to the vehicle seat frame 701.

FIG. 13 is a detail of the vehicle seat 700 along a portion of the vertical seat portion 704 with the cushions and the like removed for clarity. A plurality of upper latches 784 are shown in FIG. 13 as well. The upper latches 784 are contained in a latch housing 786, a portion of which is cut away for clarity. Each of the upper latches 784 releasably latches to a latch bar 788, which is shown as two latch bars 788. The latch bars 788 are coupled to the frame 703 of the vertical seat portion 704. The upper latches 784 comprise a latch member 790. The latch member 790 has a belt anchor 792 that is coupled to the upper end of each of the plurality of shoulder straps 756. In this example, the belt anchor 792 is an enlarge end portion with a bore. The shoulder straps 756 terminate in an engagement member 794 that has a hook end 796 that engages the bore of the belt anchor 792 to anchor the shoulder strap to the upper latch 784. The latch member has a spring clasp 796 on an end opposite the belt anchor 792 that grips the latch bar 788. The upper latches 784 also comprise a button release 798 to selectively release the spring clasp 796 from the latch bar 788 such that the harness 750 can be folded.

Figure 14:
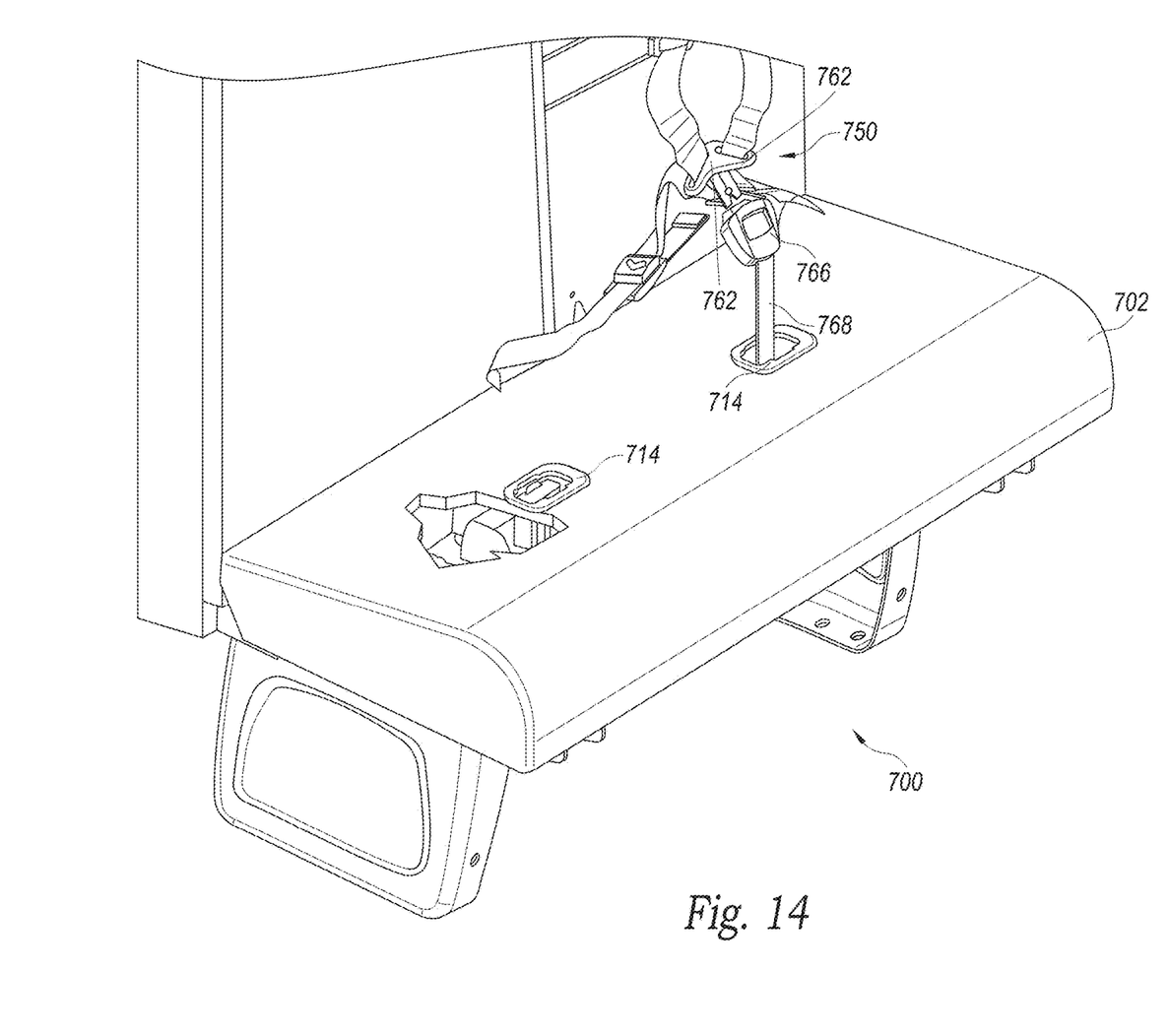
FIG. 14 is a detail of the lap belt with a portion of the horizontal seat portion removed for visibility that is consistent with the technology of the present application.

FIG. 14 shows the vehicle seat 700 with a part of the horizontal seat portion 702 cutaway. The horizontal seal portion 702 has a plurality of wells 714. As seen in FIG. 14, the female buckle 766 is in use for harness 750 that is shown as deployed. The lap belt 768 extends, from the female buckle 766 into the well 714 and is anchored. The vehicle seat 700 also has a harness 750 in the stowed position (not seen in FIG. 14). When stowed, the female buckle 766 is released from the male buckles 762. The well 714 is sized to store the female buckle 766 when the harness 750 is not in use.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A vehicle seat having a storage area comprising:
 a horizontal seat portion having a horizontal frame and a vertical seat portion having a vertical frame operably coupled to the horizontal seat portion to form a vehicle seat, the horizontal seat portion and the vertical seat portion forming a bite therebetween, the horizontal seat portion being rotationally coupled to the horizontal frame such that the horizontal seat portion is moveable between a ride position and a storage area access position; and
 a belt system selectively moveable between a storage position in the vehicle seat storage area and a deployed position on the vehicle seat, the belt system comprising:
  a base plate having a first end rotationally coupled to the vehicle seat proximal the bite and a second end opposite the first end,
  a harness plate having a first end rotationally coupled to the second end of the base plate,
  a first cushion rotationally coupled to the harness plate and configurable to reside on the horizontal seat portion when in the deployed position,
  a second cushion coupled to the harness plate and configurable to reside along the vertical seat portion when in the deployed position,
  a pair of shoulder straps anchored to the vehicle seat and extending from the first cushion through a lower latch to a corresponding pair of upper latches,
  at least one lap belt anchored to the vehicle seat and releasably coupled to the harness latch, and
  at least one latch bar coupled to the vertical frame to which the corresponding upper latches are releasably latched.

2. The vehicle seat of claim 1 wherein the at least one latch bar is a cross member coupled to the vertical frame.

3. The vehicle seat of claim 1 wherein the at least one latch bar is coupled to a vertical frame plate.

4. The vehicle seat of claim 3 wherein the at least one latch bar is a plurality of latch bars.

5. The vehicle seat of claim 1 wherein the vehicle seat is configured for use with a vehicle selected from the group of vehicles consisting of: a commercial bus, a school bus, a train, an airplane, a boat, a car, recreational vehicle, a truck, or a combination thereof.

6. The vehicle seat of claim 1 wherein the horizontal frame comprises a latch mechanism to engage the vehicle seat when the horizontal frame is in the ride position.

7. The vehicle seat of claim 1 wherein the horizontal seat portion is rotationally coupled to a front bar of the horizontal frame and wherein the horizontal seat portion has a latch coupled to a rear side of the horizontal frame to latch to a portion of the horizontal seat frame or vertical seat frame wherein the horizontal seat portion is in the ride position.

8. The vehicle seat of claim 1 wherein the vehicle storage area comprises at least one bin.

9. A method of deploying a harness stored in a storage compartment of a vehicle seat, the vehicle seat having a horizontal seat portion and a vertical back portion, the method comprising:
  unlatching a horizontal seat portion:
  pivoting the horizontal seat portion subsequent to unlatching from a ride position to a storage access position;
  rotating a harness from the storage compartment to a position to allow the horizontal seat portion to move from the storage access position to the ride position, which harness includes a first cushion, a second cushion, a plurality of shoulder straps, and a plurality of upper latches;
  extending the second cushion and the plurality of shoulder straps along the vertical back portion and coupling the upper latches to corresponding latch bars;
  pivoting the horizontal seat portion from the storage access position to the ride position; and
  arranging the first cushion of the harness on the horizontal seat portion.

10. The method of claim of claim 9, comprising latching the horizontal seat portion in the ride position after pivoting the horizontal seal portion from the storage access position to the ride position.

11. The method of claim 9 wherein the step of rotating a harness from the storage compartment comprises rotating a base plate and wherein subsequent to rotating the base plate about the axis, the horizontal seat portion is pivoted to the ride position and contacts the base plate causing the base plate to continue rotating about the axis; and rotating the first cushion until it engages the horizontal seat portion.

12. The method of claim 11 wherein the base plate is rotated until a harness plate contacts the vertical back portion.

* * * * *